(12) United States Patent
Cho et al.

(10) Patent No.: US 12,181,048 B2
(45) Date of Patent: Dec. 31, 2024

(54) APPARATUS AND METHOD FOR ASSEMBLING SOLID HYDROGEN STORAGE SYSTEM

(71) Applicants: HYUNDAI MOTOR COMPANY, Seoul (KR); KIA CORPORATION, Seoul (KR)

(72) Inventors: Young Jin Cho, Gimhae-si (KR); Kyung Moon Lee, Uiwang-si (KR); Byeong Soo Shin, Uiwang-si (KR); Hoon Mo Park, Seongnam-si (KR); Dong Hoon Nam, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/536,626

(22) Filed: Dec. 12, 2023

(65) Prior Publication Data
US 2024/0110626 A1    Apr. 4, 2024

Related U.S. Application Data

(62) Division of application No. 17/473,487, filed on Sep. 13, 2021, now abandoned.

(30) Foreign Application Priority Data

Mar. 11, 2021  (KR) .................. 10-2021-0032254

(51) Int. Cl.
*B21D 51/18*        (2006.01)
*B21D 51/24*        (2006.01)
(Continued)

(52) U.S. Cl.
CPC .............. *F16J 13/08* (2013.01); *B21D 51/18* (2013.01); *B21D 51/24* (2013.01); *F16J 13/10* (2013.01);
(Continued)

(58) Field of Classification Search
CPC ... B21D 51/18; B21D 51/24; Y10T 29/49893; Y10T 29/49904; F17C 13/002;
(Continued)

(56) References Cited

U.S. PATENT DOCUMENTS 5,697,221 A   12/1997  Sapru et al.
8,464,884 B2  6/2013   Shearin
(Continued)

FOREIGN PATENT DOCUMENTS

CN    214306496 U    9/2021
CN    115321477 A   11/2022
(Continued)

OTHER PUBLICATIONS

JP-03256890 English Abstract Machine Translation (Year: 1991).
CN-115321477 English Machine Translation (Year: 2022).
CN-214306496 English Machine Translation (Year: 2021).

*Primary Examiner* — Jermie E Cozart
(74) *Attorney, Agent, or Firm* — MCDONNELL BOEHNEN HULBERT & BERGHOFF LLP

(57) ABSTRACT

An apparatus for assembling a solid hydrogen storage system includes a lower support installed to support a lower side of material blocks to be assembled, split covers assembled in multiple stages on an upper side of the lower support and forming therein a closed space in which the material blocks are capable of being assembled, the split covers being configured to be separated in a horizontal direction, and gas injection ports provided in the split covers to inject an inert gas into an inner space of the split covers.

4 Claims, 7 Drawing Sheets

(51) Int. Cl.
  *F16J 13/08* (2006.01)
  *F16J 13/10* (2006.01)
  *F16J 13/24* (2006.01)
  *F17C 1/00* (2006.01)
  *F17C 13/00* (2006.01)
  *F17C 13/08* (2006.01)

(52) U.S. Cl.
  CPC ............... *F16J 13/24* (2013.01); *F17C 1/005* (2013.01); *F17C 13/002* (2013.01); *F17C 13/08* (2013.01); *F17C 2205/0107* (2013.01); *F17C 2205/0123* (2013.01); *F17C 2205/0169* (2013.01); *F17C 2221/012* (2013.01); *Y10T 29/49893* (2015.01); *Y10T 29/49904* (2015.01)

(58) Field of Classification Search
  CPC .............. F17C 13/08; F17C 2205/0107; F17C 2205/0169; F17C 2221/012
  See application file for complete search history.

(56) References Cited

U.S. PATENT DOCUMENTS

| | | |
|---|---|---|
| 2005/0029425 A1 | 2/2005 | Garton |
| 2008/0168776 A1 | 7/2008 | Arnold et al. |

FOREIGN PATENT DOCUMENTS

| | | |
|---|---|---|
| JP | H03-256890 A | 11/1991 |
| KR | 20200111317 A | 9/2020 |

(S80)

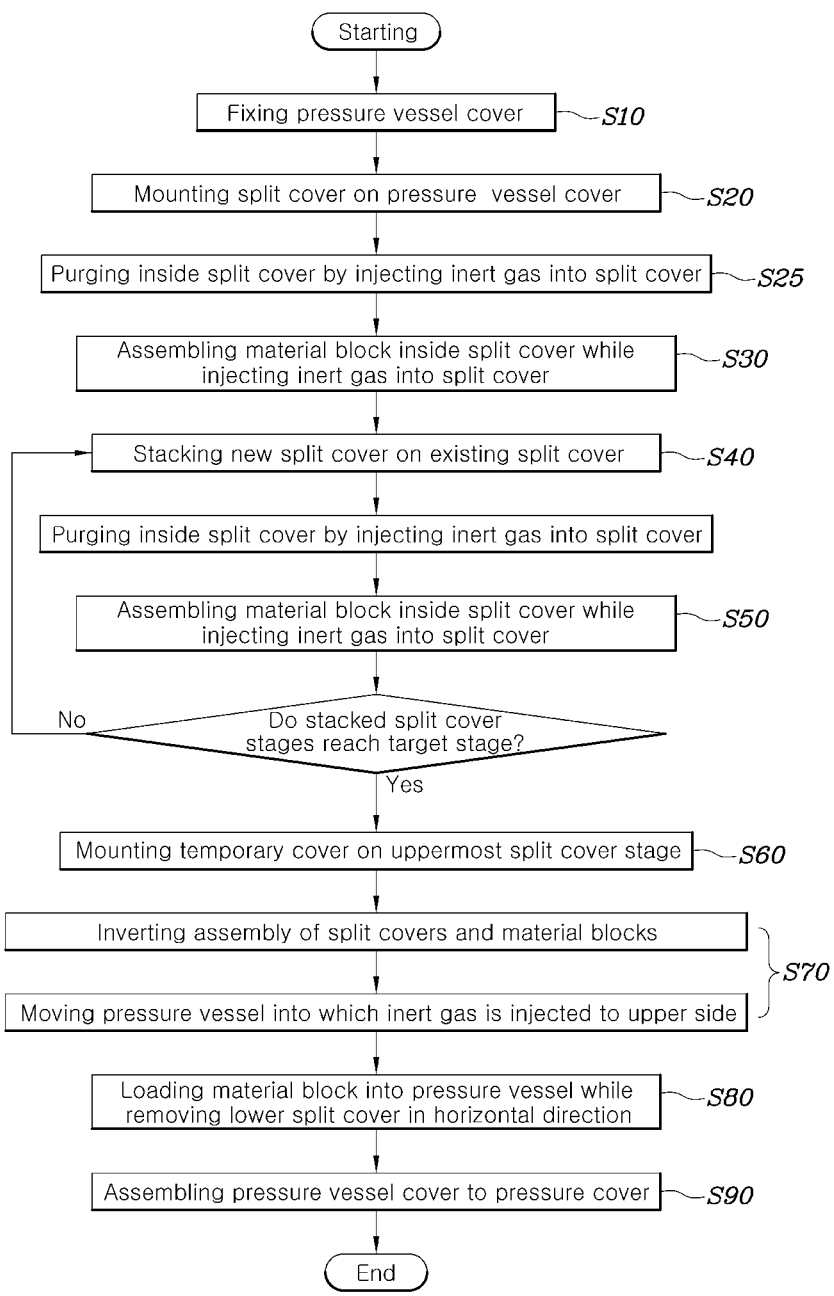

APPARATUS AND METHOD FOR ASSEMBLING SOLID HYDROGEN STORAGE SYSTEM

CROSS REFERENCE TO RELATED APPLICATIONS

The present application is a divisional of U.S. patent application Ser. No. 17/473,487, filed Sep. 13, 2021, which claims priority to Korean Patent Application No. 10-2021-0032254, filed Mar. 11, 2021, the entire contents of which is incorporated herein for all purposes by this reference.

BACKGROUND

1. Field

The present disclosure relates to a technique for assembling a solid hydrogen storage system.

2. Description of Background Art

A solid hydrogen storage system is a system configured to be capable of storing and releasing hydrogen as necessary using a solid hydrogen storage material such as a hydrate or an alloy capable of storing hydrogen in a solid state.

When the solid hydrogen storage material is exposed to air or moisture, the properties of the material are deteriorated due to oxidation, and there is a risk of fire when the material is in contact with moisture.

Accordingly, when assembling a solid hydrogen storage system made of a solid hydrogen storage material, it is necessary to assemble the system such that the solid hydrogen storage material is not exposed to air or moisture.

Conventionally, the solid hydrogen storage material is manufactured in the form of pieces that are capable of being assembled with each other so as to form one compact structure, and a plurality of pieces are assembled in a pressure vessel so as to constitute the high hydrogen storage system.

For reference, hereinafter, a piece made of a solid hydrogen storage material as described above will be referred to as a "material block", and the material block should be interpreted as encompassing various shapes such as an arc shape as well as a simple hexahedron.

As described above, in order to assemble and stack a plurality of material blocks in the pressure vessel, it is necessary to perform work in an inert gas atmosphere so as to prevent the material blocks from coming into contact with air and moisture.

Conventionally, in order to assemble material blocks in an inert gas atmosphere as described above, an inert gas atmosphere is formed inside a glove box and the material blocks are assembled therein. However, there are disadvantages to this assembly method in that it takes considerable time and cost to form an inert atmosphere inside the glove box, in that assembly precision is reduced due to the use of the glove box, and in that the size that can be assembled is limited.

It should be understood that the foregoing description of the background art is provided merely for the purpose of promoting the understanding of the background of the present disclosure and should not be accepted as acknowledging that the background art is known to those skilled in the art.

SUMMARY

In an aspect, the present disclosure provides an apparatus and a method of assembling a solid hydrogen storage system, which makes it possible to prevent excessive time and cost from being required to form an inert atmosphere while enabling assembly of material blocks in the inert atmosphere, to improve assembly precision, to reduce assembly time, and to considerably increase the range of sizes and weights capable of being assembled.

In view of the foregoing, an apparatus for assembling a solid hydrogen storage system includes: a lower support installed to support the lower side of material blocks to be assembled, split covers assembled in multiple stages on the lower support and forming therein a closed space in which the material blocks are capable of being assembled, the split covers being configured to be capable of being separated in a horizontal direction, and gas injection ports provided in the split covers to inject an inert gas into a space inside the split covers.

The gas injection ports may be provided for respective stages formed by stacking the split covers upward.

Each of the split covers may include two semicylindrical plates, each of which has a semicircular shape in cross section so as to form one circle in cross section when the plates are coupled to each other.

The semicylindrical plate may include side flanges, which are coupled to side flanges of another semicylindrical plate so as to form a split cover, wherein when the split cover is disassembled, the side flanges allow the semicylindrical plates to be separated from each other in a direction perpendicular to a direction in which the split covers are stacked, and an upper flange to which another split cover to be stacked thereon is coupled and a lower flange which is stacked on and coupled to yet another split cover.

At least one of the two semicylindrical plates forming each of the split covers may be provided with the gas injection port.

A plurality of vertically elongated support rods are provided on the lower support and arranged around the split covers assembled in multiple stages, and the support rods may be connected to each other by connecting members to surround and support a periphery of the split covers.

A temporary cover may be coupled to an uppermost stage of the split covers assembled in multiple stages.

In view of the foregoing, a method for assembling a solid hydrogen storage system of the present disclosure may include fixing a pressure vessel cover on a lower support, mounting a split cover on the pressure vessel cover, assembling material blocks inside the split cover while supplying an inert gas into a gas injection port of the split cover, stacking and coupling a new split cover on the split cover, and assembling another material block inside the stacked new split cover while supplying the inert gas into a gas injection port of the stacked new split cover. The stacking of the new split cover and the assembling of the other material block while supplying the inert gas into the gas injection port of the new split cover are repeated until a target stage is assembled and coupled.

Whenever the split covers are stacked by a predetermined number of reference stages, a plurality of support rods may be erected around the split covers, and the support rods may be interconnected by connecting members so as to support a periphery of the stacked split covers.

The split covers may be stacked to a target stage, the material blocks may be assembled, and then the top stage may be sealed with a temporary cover.

The method may further include after the stacking of the split covers to the target stage is completed, moving an assembly of the split covers and the material blocks to the upper side of a pressure vessel into which the inert gas is injected, in the state in which the assembly of the split covers and the material blocks is inverted such that the lower support is positioned at an upper side and the temporary cover is positioned at a lower side, and sequentially loading the material blocks assembled in the stacked split covers into the pressure vessel while sequentially removing the stacked split covers in a horizontal direction from the lower side.

According to the present disclosure, it is possible to prevent excessive time and cost from being required to form an inert atmosphere while enabling assembly of material blocks in the inert atmosphere, to improve assembly precision, to reduce assembly time, and to considerably increase the range of sizes and weights capable of being assembled.

BRIEF DESCRIPTION OF THE FIGURES

The above and other aspects, features and advantages of the present disclosure will be more apparent from the following detailed description taken in conjunction with the accompanying drawings, in which:

FIG. 7 is a flowchart illustrating an embodiment of a method for assembling a solid hydrogen storage system according to the present disclosure.

DETAILED DESCRIPTION

Figure 1:
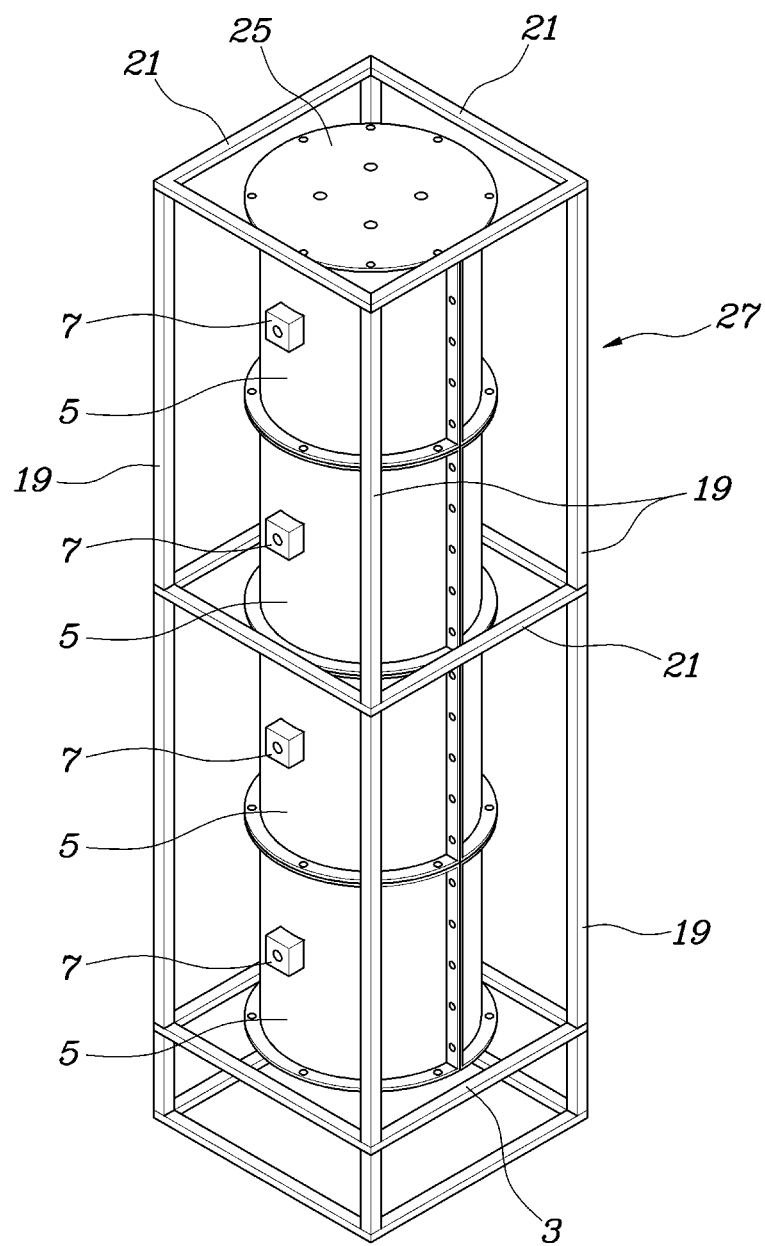
FIG. 1 is a view illustrating an assembly apparatus for assembling a solid hydrogen storage system according to the present disclosure.

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to describe various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e. "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, exemplary embodiments of the present disclosure will be described in detail with reference to the accompanying drawings. The same or like reference signs presented in the drawings designate the same or like elements.

Referring to the accompanying drawings, an embodiment of an assembly apparatus for assembling a solid hydrogen storage system includes a lower support 3 installed to support the lower side of material blocks 1 to be assembled, split covers 5 assembled in multiple stages on the lower support 3 and forming therein a closed space in which the material blocks 1 are capable of being assembled, the split covers being configured to be capable of being separated in a horizontal direction, and gas injection ports 7 provided in the split covers 5 to inject an inert gas into a space inside the split covers 5.

That is, by forming a closed space on the lower support 3 using the split cover 5, and repeating, while stacking the split covers 5, the process of assembling the material blocks 1 while injecting the inert gas into the closed space through the gas injection port 7, it is possible to assemble and stack the material blocks 1 in the space surrounded by the split covers 5.

Figure 3:
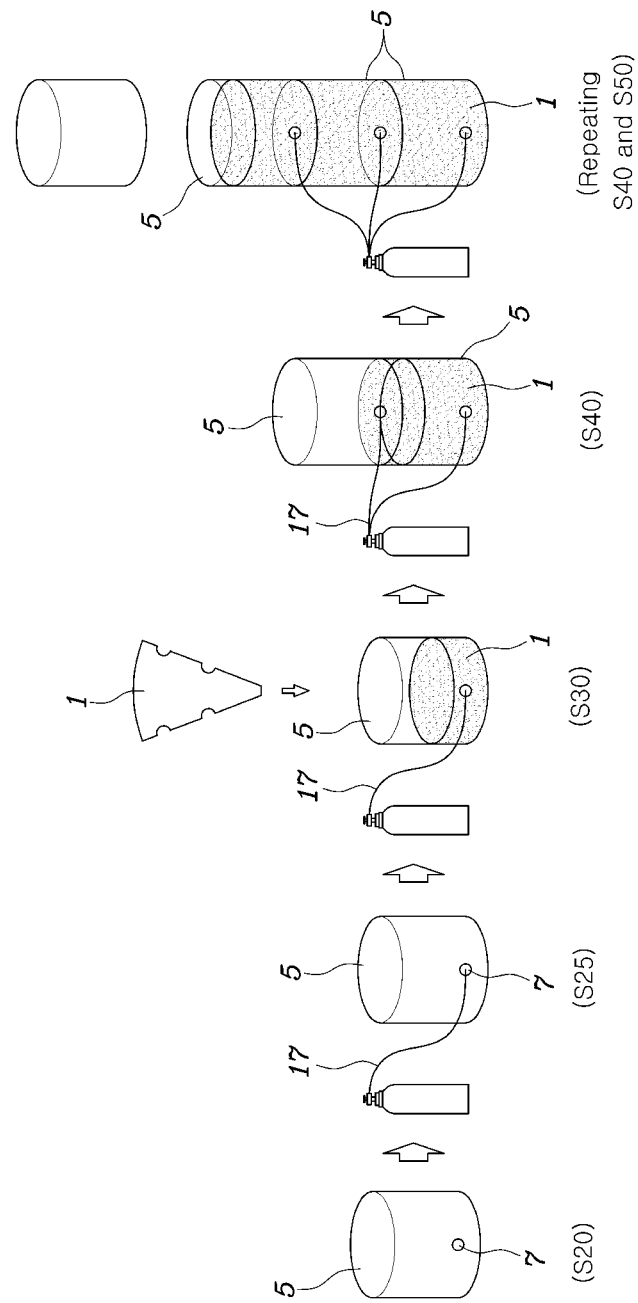
FIG. 3 is a view illustrating a process of assembling material blocks while stacking split covers using the assembly apparatus of FIG. 1.

It is preferable to provide the gas injection port to each of the stages formed by stacking the split covers 5 upward. As illustrated in FIG. 3, whenever the split cover 5 is stacked, by supplying in parallel the inert gas to the gas injection ports 7 of the split covers 5 forming each stage, it is possible to fundamentally prevent oxidation and moisture contact of the material blocks 1 assembled inside the split covers.

Figure 2:
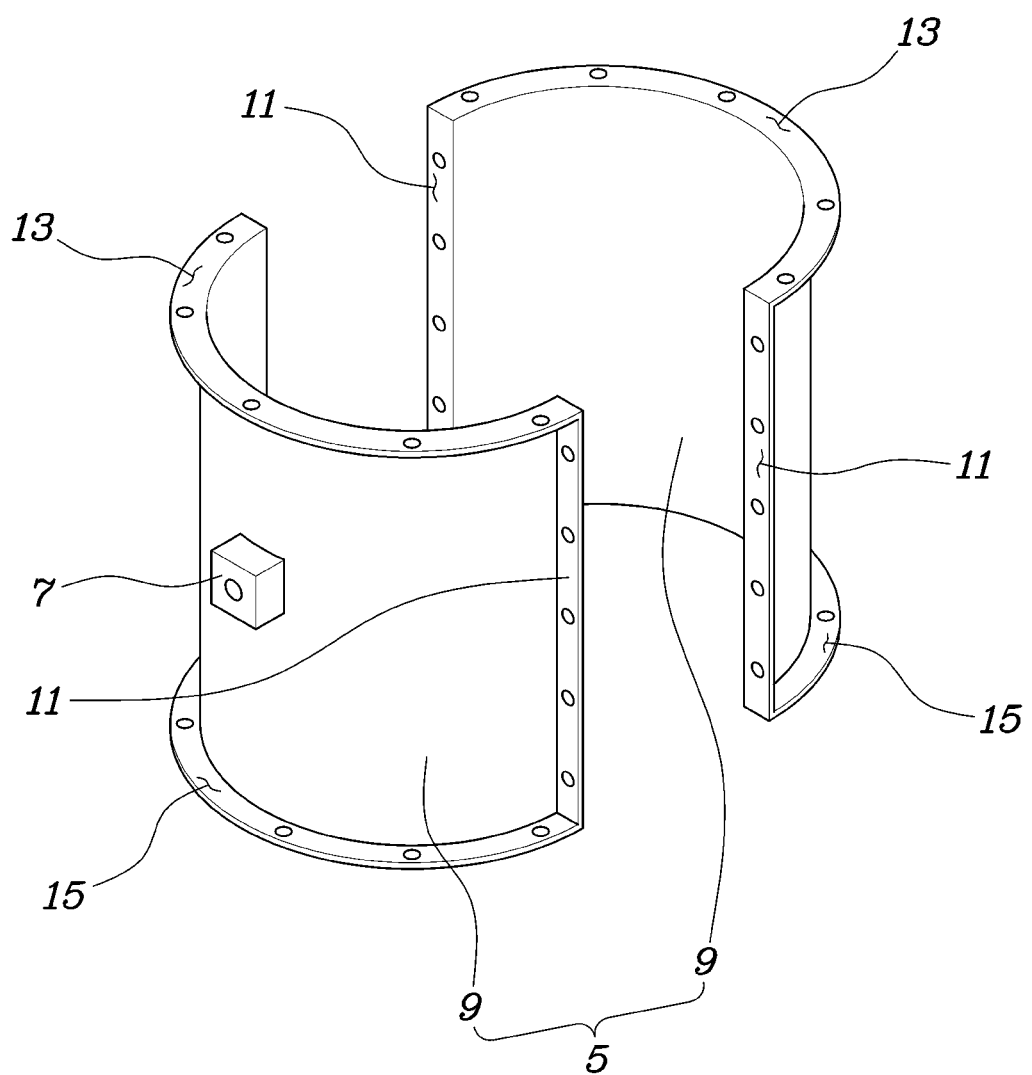
FIG. 2 is a view illustrating in detail the structure of a split cover in the assembly apparatus of FIG. 1.

As illustrated in FIG. 2, each of the split covers 5 may include two semicylindrical plates 9, each of which has a semicircular shape in cross section so as to form one circle in cross section when the two semicylindrical plates 9 are coupled to each other.

In an alternative embodiment, each of the split covers 5 may be configured using polygonal plates or the like.

In the present embodiment, each semicylindrical plate 9 may include side flanges 11, which are coupled to side flanges of another semicylindrical plate so as to form a split cover, wherein when the split cover is disassembled, the side flanges allow the semicylindrical plates to be separated from each other in a direction perpendicular to a direction in which the split covers are stacked, and an upper flange 13 to which another split cover 5 to be stacked thereon is coupled and a lower flange 15 which is stacked on and coupled to still another split cover 5.

Therefore, in the state in which one split cover 5 is formed by coupling the side flanges 11 of the semicylindrical plates 9 to each other using fastening elements such as bolts, the split cover 5 is stacked on the lower support 3 or on another split cover 5 assembled on the lower support 3, and then the lower flange 15 is coupled using fastening elements such as bolts, whereby it is possible to form a stable stacked structure.

At least one of the two semicylindrical plates 9 forming each of the split covers 5 is provided with the gas injection port 7.

In FIG. 2, the gas injection port 7 is shown formed only in the left semicylindrical plate 9. However, when the split cover 5 is assembled using the right semicylindrical plate 9, which is also provided with the gas injection port 7, it may be possible to assemble the semicylindrical plates 9 without checking for the presence or absence of the gas injection port 7. Considering the prime cost, the gas injection port 7 may be provided only in one semicylindrical plate 9 as illustrated in the figure.

For reference, it would be desirable to incorporate a check valve in the gas injection port 7 such that the inert gas injected into the inside does not leak to the outside even when the gas supply pipe 17 is removed from the gas injection port 7.

Meanwhile, on the lower support 3, a plurality of support rods 19 are provided to extend vertically around the stacked split covers 5, and the support rods 19 are connected to each other via connecting members 21 so as to surround and support the periphery of the split covers 5.

The support rods 19 and the connecting members 21 are not directly coupled to the split covers 5, but the connecting members 21 are coupled in the state of allowing only a small space within several millimeters (mm) around the split covers 5, thereby serving to substantially reinforce the rigidity of the stacked split covers 5.

As described above, the process of assembling the material blocks 1 inside the split covers 5 while stacking the split covers 5 is performed in accordance with the length of the pressure vessel 23 into which the material blocks 1 assembled in the split covers 5 are to be loaded.

That is, a target stage to be formed by stacking the split covers 5 is determined in accordance with the stacking height of the material blocks 1 to be loaded into the pressure vessel 23, and the split covers 5 are stacked and the material blocks 1 are assembled therein until reaching the target stage. This process of assembling and stacking the material blocks 1 is continuously performed in an inert gas atmosphere by supplying the inert gas to the gas injection ports 7.

The temporary cover 25 is coupled to the uppermost end of the split covers 5 stacked as described above so as to consequently achieve the state illustrated in FIG. 1, and then the assembly 27 of the split covers 5 and the material blocks 1 in the state illustrated in FIG. 1 is inverted up and down so that the material blocks 1 are loaded into and assembled in the pressure vessel 23, thereby completing a hydrogen storage vessel of a solid hydrogen storage system, as will be described below.

For reference, when it is possible to assure the rigidity of the stacked split covers 5 to such an extent that rigidity reinforcement by the support rods 19 and the connecting members 21 is not required, it would be also possible to form an assembly of the split covers and the material blocks by stacking only the split covers 5 without the structure of the support rods 9 and the connecting members 21, and to invert the assembly such that the material blocks 1 are loaded into the pressure vessel 23.

Hereinafter, a method of assembling a solid hydrogen storage system using the above-described apparatus for assembling a solid hydrogen storage system will be described with reference to FIGS. 3 to 7.

A method of assembling a solid hydrogen storage system according to the present disclosure includes: fixing a pressure vessel cover 29 on a lower support 3 (S10), mounting a split cover 5 on the pressure vessel cover 29 (S20), purging the inside of the split cover 5 by supplying an inert gas into the gas injection port 7 of the split cover 5 (S25) and then assembling material blocks 1 inside the split cover 5 in the state in which the inert gas is continuously supplied (S30), stacking and coupling a new split cover 5 on the split cover 5 (S40), and assembling another material block 1 inside the stacked new split cover 5 while supplying the inert gas into a gas injection port 7 of the stacked new split cover 5 (S50).

Here, the stacking of the new split cover 5 and the assembling of the other material block 1 while supplying the inert gas to the gas injection port 7 of the new split cover 5 are repeated until the stacking of the split covers 5 is performed to a target stage.

Figure 6:
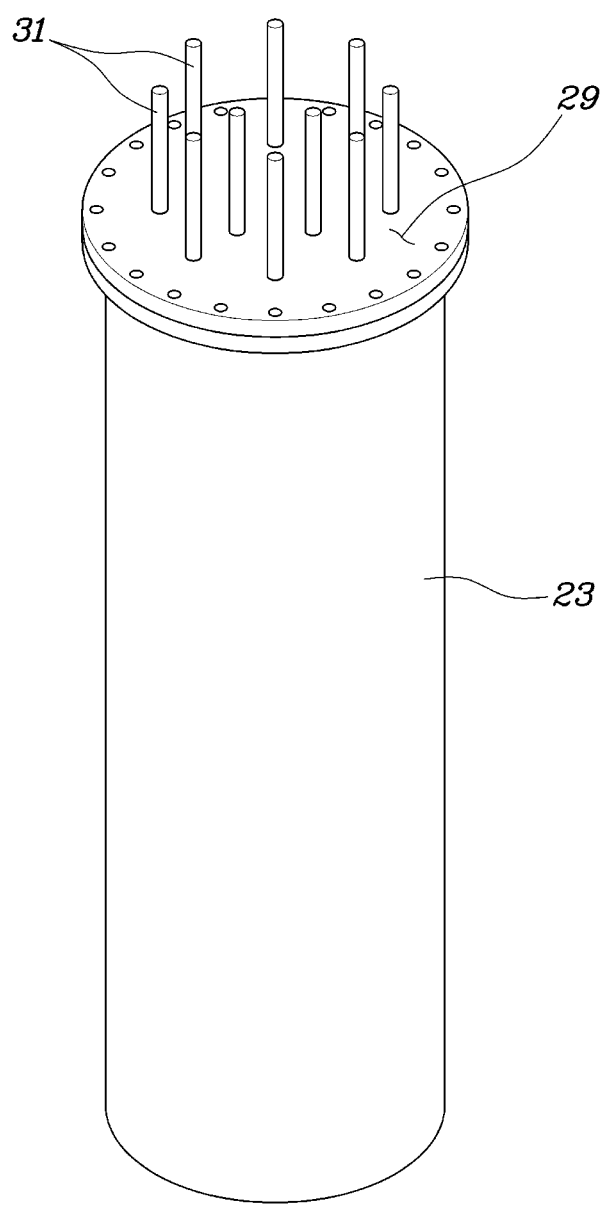
FIG. 6 is a view illustrating the pressure vessel in which the loading of the material is completed through the process of FIG. 4.

As can be seen from FIG. 6, it is necessary to assemble the pressure vessel cover 29 on the upper side of the pressure vessel 23. Thus, the pressure vessel cover 29 is mounted on the lower support 3 in advance, the split covers 5 are stacked thereon, and the material blocks 1 are assembled. Then, as will be described later, when the assembly of the split covers 5 and the material blocks 1 is inverted up and down and coupled to the pressure vessel 23, the pressure vessel cover 29 is automatically positioned above the pressure vessel 23.

For reference, the assembly 27 of the split covers 5 and the material blocks 1 refers to the state illustrated in FIG. 1.

The material blocks 1 assembled in the split covers 5 may be configured in various shapes, but in the embodiment illustrated in FIG. 3, each material block 1 has a fan shape so as to form a circle when the material block 1 is assembled with other material blocks 1.

Figure 4:
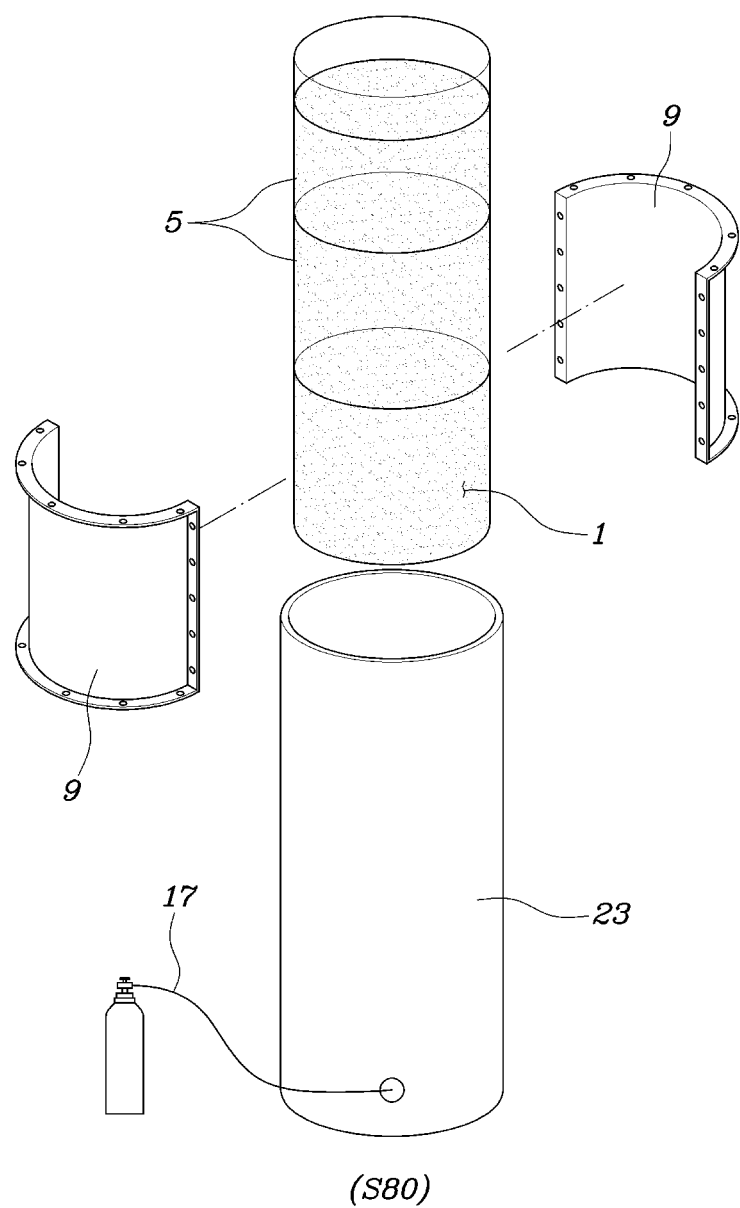
FIG. 4 is a view illustrating a process of loading the material blocks into a pressure vessel using an assembly of the split covers and the material blocks after the process of FIG. 3 is completed.
Figure 5:
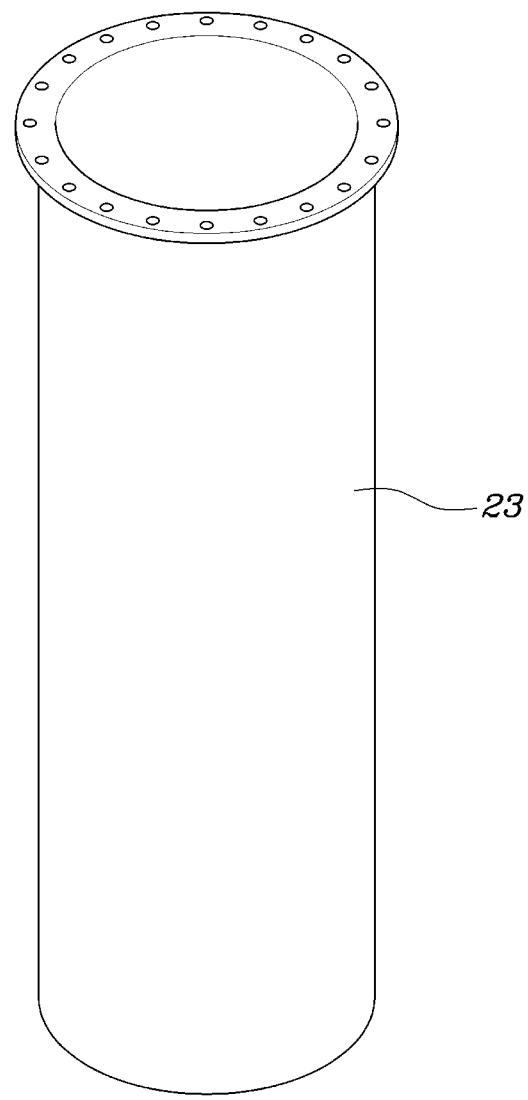
FIG. 5 is a view illustrating the pressure vessel used in FIG. 4.

For reference, in FIGS. 3 and 4, the state in which the fan-shaped material blocks 1 are assembled in the split covers 5 is represented by hatching the material blocks 1 using points.

It is preferable to supply the material blocks 1 in an airtightly packed state, to remove the airtight packaging in an inert atmosphere above the split covers 5, and to assemble the material blocks 1 inside the split covers 5.

Meanwhile, whenever the stacking of the split covers 5 is made by a predetermined number of reference stages, a plurality of support rods 19 are erected around the split covers 5, and connected using the connecting members 21 such that the periphery of the stacked split covers 5 is supported, whereby it is possible to form the state illustrated in FIG. 1.

The number of reference stages may be regarded as two stages in the embodiment of FIG. 1, but the embodiment is not limited thereto. The number of reference stages may be determined as one or three or more stages in consideration of the height and structural stability of the split covers 5 to be stacked.

After stacking the split covers 5 to the target stage and assembling the material blocks 1, the upper end is sealed with the temporary cover 25 (S60).

In the state in which the assembly of the split covers 5 and the material blocks 1 is inverted such that the lower support 3 is positioned at the upper side and the temporary cover 25 is positioned at the lower side after the split covers 5 are stacked to the target stage, moving the assembly 27 to the upper side of the pressure vessel 23 into which the inert gas is injected as illustrated in FIG. 4 to the upper side (S70) and sequentially loading the assembled material blocks 1 into the pressure vessel 23 while sequentially removing the stacked split covers 5 in the horizontal direction from the lower side (S80) are sequentially performed.

In the state in which an inert atmosphere is formed in the upper side of the pressure vessel 23 by continuously supplying the inert gas to the pressure vessel 23 in the state in which a purge to remove air from the inside of the pressure vessel 23 is completed in advance, the temporary cover 25 and the lowermost split cover 5 are removed, and the material blocks 1 therein are loaded into the pressure vessel 23.

As the material blocks 1 are loaded into the pressure vessel 23, when the upper split covers 5 are sequentially removed in the horizontal direction so that all the material blocks 1 of the assembly 27 are loaded into the pressure vessel 23, the pressure vessel cover 29 is finally located on the pressure vessel 23, and when the pressure vessel cover 29 is assembled to the pressure vessel 23 (S90), the hydrogen storage vessel of the solid hydrogen storage system into which the material blocks 1 are loaded is completed.

Therefore, while the material blocks 1 wrapped with the split covers 5 as described above are loaded into the pressure vessel 23, an inert gas atmosphere is continuously formed around the material blocks 1. Thus, it is possible to smoothly perform the assembly work while effectively preventing the occurrence of fire due to oxidation and contact with moisture.

Referring to FIG. 6, a plurality of pipes protruding upward from the pressure vessel cover 29 are heat exchange pipes 31 constituting passages of a heat medium for heat exchange with the material blocks 1 inside the pressure vessel 23, and may be inserted at an appropriate time before and after the assembly of the material blocks 1.

When the assembly method is used with the apparatus for assembling a solid hydrogen storage system according to the present disclosure as described above, it is possible to prevent excessive time and cost from being required to form an inert atmosphere while enabling assembly of material blocks 1 in the inert atmosphere, to improve assembly precision, to reduce assembly time, and to increase the range of sizes and weights capable of being assembled.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

The invention claimed is:

1. A method of assembling a solid hydrogen storage system, the method comprising:
   fixing a pressure vessel cover on a lower support;
   mounting a split cover on the pressure vessel cover;
   assembling material blocks inside the split cover while supplying an inert gas into a gas injection port of the split cover;
   stacking and coupling a new split cover on the split cover; and
   assembling another material block inside the stacked new split cover while supplying the inert gas into a gas injection port of the stacked new split cover;
   wherein the stacking the new split cover and the assembling the another material block while supplying the inert gas into the gas injection port of the new split cover are repeated until a target stage is assembled and coupled.

2. The method of claim 1, wherein, whenever the split covers are stacked by a predetermined number of reference stages, a plurality of support rods are erected around the split covers, and the support rods are interconnected by connecting members so as to support a periphery of the stacked split covers.

3. The method of claim 1, wherein the split covers are stacked to the target stage, the material blocks are assembled, and then the top stage of the target stage is sealed with a temporary cover.

4. The method of claim 3, wherein, after the stacking of the split covers to the target stage is completed, the method further comprises:
   moving an assembly of the split covers and the material blocks to an upper side of a pressure vessel into which the inert gas is injected in a state in which the assembly of the split covers and the material blocks is inverted such that the lower support is positioned at an upper side and the temporary cover is positioned at a lower side; and
   sequentially loading the material blocks assembled in the stacked split covers into the pressure vessel while sequentially removing the stacked split covers in a horizontal direction from the lower side.

* * * * *